Oct. 11, 1966     K. M. BOHLANDER ET AL     3,277,565
METHOD OF CLADDING YTTRIUM HYDRIDE
AND YTTRIUM BASE ALLOY HYDRIDES
Filed Nov. 8, 1963
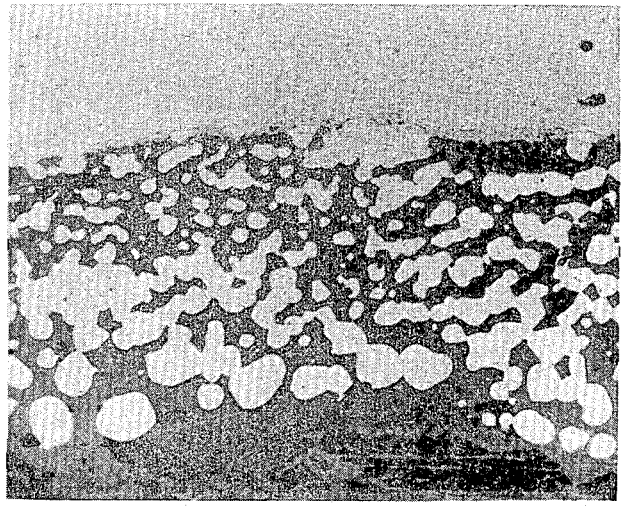
INVENTORS.
Karl M. Bohlander
Earl S. Funston
James A. McGurty
BY
ATTORNEY.

' # United States Patent Office 3,277,565
Patented Oct. 11, 1966

3,277,565
METHOD OF CLADDING YTTRIUM HYDRIDE AND YTTRIUM BASE ALLOY HYDRIDES
Karl M. Bohlander, West Chester, Earl S. Funston, Hamilton, and James A. McGurty, Cincinnati, Ohio, assignors to the United States of America as represented by the United States Atomic Energy Commission
Filed Nov. 8, 1963, Ser. No. 322,554
8 Claims. (Cl. 29—470)

Our invention relates to moderator materials for nuclear reactors and more particularly to a method of cladding yttrium hydride and yttrium-base alloy hydrides.

Yttrium hydride offers unique advantages as a moderator for high temperature thermal nuclear reactors. In contrast to other hydrides under consideration as moderators, this material retains its relatively high content of hydrogen at elevated temperatures such as 1600° F. to 2100° F. In addition, the nuclear properties of yttrium hydride are favorable, and its thermal conductivity is excellent. Some of the problems encountered in the use of this material have been its susceptibility to cracking when subjected to thermal cycling and its reactivity with oxygen and nitrogen at elevated temperatures. The cracking problem has been alleviated by the development of yttrium-base alloys such as yttrium-30 weight percent zirconium and yttrium-5 weight percent chromium which, when hydrided, exhibit improved mechanical strength, along with suitable hydrogen retention. The chemical reactivity with oxygen and nitrogen has required cladding of the hydride with a protective alloy for applications wherein the moderator assembly is exposed to air.

Another yttrium-base hydride useful for high-temperature reactors is a hydrided yttrium alloy containing 10 weight percent uranium. This material, which serves as both fuel and moderator, also requires cladding with a protective alloy.

Various alloys have desirable properties for cladding of yttrium-base hydrides. Oxidation-resistant alloys of iron with chromium, aluminum and yttrium, e.g., Fe-15 to 30 Cr-3 to 5 Al-0.7 to 1.0 Y, have been developed, and these alloys are particularly suitable for high-temperature service in an oxidizing environment. Other iron-base, nickel-base or chromium-base oxidation-resistant alloys also are useful as cladding materials.

The chief problem presented in the fabrication of clad yttrium-base hydride moderator bodies has been the difficulty of bonding the cladding alloy to the hydride body. A metallurgical bond is essential in order to obtain efficient heat transfer, to insure dimensional stability of the component, to decrease hydrogen migration due to temperature differentials and to increase strength and shock resistance. The solid solubilities of the above-mentioned cladding alloys with the hydride is so low that bonding by means of a recrystallization effect is precluded. Both liquid and solid cementing additives applied at the interface have also proven ineffective. Partial bonding has been achieved by bringing the hydride and alloy surfaces into contact and subjecting the interface to hot-working, but this method has not produced an effective, complete bond.

It is, therefore, an object of our invention to provide a method of cladding bodies of yttrium hydride and yttrium-base alloy hydrides with a protective alloy.

Another object is to provide a method of metallurgically bonding said hydrides to iron-base alloys containing 15 to 30 percent chromium, 3 to 5 percent aluminum and 0.7 to 1.0 percent yttrium and other oxidation-resistant alloys having iron, chromium or nickel as the base metal.

Other objects and advantages of our invention will be apparent from the following detailed description and claims appended hereto.

In accordance with our invention an oxidation-resistant metal clad yttrium hydride body is prepared by coating a yttrium metal body with a thin layer of metallic chromium, heating the coated body at a temperature of 2000° F. to 2260° F. in a non-oxidizing atmosphere whereby the chromium is bonded to the yttrium metal, hydriding the bonded, chromium-coated body and cladding the resulting chromium-coated hydride body with an oxidation-resistant metal. A continuous metallurgical bond between the hydride and the cladding is readily obtained by this method, and the resulting clad hydride body exhibits favorable heat-transfer hydrogen-retention and mechanical characteristics.

We have found that bonding of cladding metal to yttrium hydride is readily achieved by bonding a layer of chromium to the yttrium metal before conversion to hydride and subsequently bonding the cladding to the chromium. The chromium serves as an effective bonding agent without interfering with diffusion of hydrogen into the yttrium metal during hydriding.

The method of our invention is broadly applicable to yttrium hydride and hydrided yttrium-base alloys. In particular, this method is useful for yttrium-zirconium alloys containing up to 30 weight percent zirconium, yttrium-chromium alloys containing up to 5 weight percent chromium and yttrium-uranium alloys containing up to 10 weight percent uranium.

The starting yttrium metal or yttrium-base alloy body may be shaped to the desired configuration by conventional techniques such as machining. Although our invention is not so limited, the yttrium body, which retains its shape during hydriding, is normally prepared in a block-like shape for use as a moderator. In order to enhance adhesion of chromium to the metal body, the surface may be de-greased by conventional techniques such as ultrasonic cleaning with trichloroethylene and slightly roughened by means such as sand-blasting.

A thin layer of chromium is then applied to the metal body. A layer thickness of at least 0.001 inch is required for effective bonding, and at a thickness above 0.010 inch, blisters tend to form on the surface in the subsequent heat-treatment. A thickness of 0.003 to 0.005 inch is preferred. The method of applying the chromium layer is not critical, but conventional flame-spraying under an atmosphere of an inert gas such as argon is preferred. The chromium may also be applied by techniques wherein chromium powder is suspended in an organic binder and the resulting suspension is coated on the surface, with the binder being removed by low-temperature volatilization.

The chromium layer is then bonded to the yttrium body by heating to a temperature of 2000° F. to 2260° F. in a non-oxidizing atmosphere. This treatment must be effected prior to hydriding in order to obtain a bond between the chromium and the hydride. If the metal is converted to hydride without bonding and while the chromium is attached only by mechanical adhesion, the chromium-yttrium interface would be disrupted during hydriding owing to the change in crystal structure from hexagonal close-packed in yttrium metal to face-centered cubic in yttrium hydride ($YH_2$), with an accompanying expansion of over one percent. As a result, no bond would be established between the chromium and the hydride, and the chromium would spall off or become insecurely attached in the subsequent cladding step. When bonded to the yttrium, the chromium layer has sufficient strength to withstand the stresses generated in hydriding. A temperature of at least 2000° F. is required for bonding the chromium layer to the yttrium body, and 2100° F. to 2200° F. is preferred. Temperatures in excess of 2260° F. result in the formation of a eutectic and impairment of the bond. Non-oxidizing conditions are required to prevent oxidation, and an atmosphere of an inert gas or a vacuum may be employed for this purpose. The chromium-coated body is held at temperature for a period sufficient to effect metallurgical bonding by inter-diffusion. At the preferred temperature of 2100° F. to 2200° F. a period of about 1 to 4 hours is sufficient for this purpose. For example, bonding is completed in 2 hours at 2150° F. for a coating thickness of 0.005 inch. Longer periods are required at lower temperatures.

Following bonding of the chromium layer, the yttrium body is hydrided by contacting with hydrogen at an elevated temperature. The chromium allows free passage of hydrogen by diffusion so that hydriding is not materially affected, and previously known hydriding methods may be employed. In a preferred hydriding procedure, the specimen is heated to 1800° F. in a furnace retort evacuated to a pressure of 25 microns or less. Hydrogen is then metered into the retort at a rate of 100 cubic centimeters per minute for approximately 24 hours. If the hydrogen pressure in the retort is then less than 700 millimeters of mercury, the hydrogen flow rate is increased to 300 cubic centimeters per minute for a second 24 hour period and to 500 cubic centimeters per minute for successive 24 hour periods until the hydrogen pressure reaches 700 millimeters of mercury. A total period of about 70 hours is required for a five-pound specimen under these conditions. The hydrogen flow is then cut off and the specimen is allowed to cool to room temperature. A hydrogen content of 2 weight percent is obtained by this procedure.

The resulting chromium-coated hydride body, after removal of any surface roughness incurred in hydriding, may be readily clad by conventional methods with cladding metals suitable for high-temperature nuclear reactor service. Our invention is not limited to a particular cladding material, and any metal capable of forming a bond with chromium may be joined to the hydride body prepared as described above. In general, alloys having iron, chromium or nickel as the base metal are employed as cladding metals, and these metals form a metallurgical bond with chromium. Iron-base alloys containing chromium and aluminum are of particular interest for high-temperature use. For reactor applications wherein the unique hydrogen-retention capability of yttrium hydride is utilized, namely, for reactors operating in air at temperatures from 1600° F. to 2200° F., iron-base alloys containing about 15 to 30 weight percent chromium, 3 to 5 weight percent aluminum, and 0.7 to 1.0 weight percent yttrium are preferred because of their superior resistance to oxidation at these temperatures. Bonding of the cladding, which is normally in the form of a metal sheet 0.005 to 0.030 inch thick, may be effected by methods such as hot pressing or gas-pressure bonding. In one embodiment for cladding with iron-chromium-aluminum-yttrium alloys the unbonded pieces are loaded in a pneumatic pressure chamber, the pieces being supported to prevent distortion. The chamber is sealed, evacuated and filled with helium. The chamber is then heated to a temperature of about 1600° F. and the helium pressure is increased to 500 pounds per square inch. The temperature is further increased to about 1900° F. to 2000° F. and the pressure to 1000 to 2000 pounds per square inch. These conditions are maintained for a period of 2 to 5 hours to ensure complete bonding.

The clad hydride bodies prepared by this method have excellent heat-transfer and mechanical properties since a continuously bonded structure is obtained.

Our invention is further illustrated by the following specific examples.

Example I

An oxidation-resistant alloy clad yttrium hydride specimen 3 inches by 15 inches and 0.75 inch thick was prepared by the following procedure. An yttrium metal piece was machined to size and the surface was cleaned by ultrasonic de-greasing with trichloroethylene. A layer of chromium 0.003 inch thick was then applied by flame-spraying. The chromium was then bonded to the yttrium by heating at 2150° F. for 2 hours in an atmosphere of helium. The yttrium was then hydrided by contacting the piece with hydrogen at a temperature of 1800° F. for 75 hours. A 0.015 inch thick sheet of iron-base cladding alloy containing 25 weight percent chromium and 5 weight percent aluminum was then applied to the hydrided body and bonded by heating under a pressure of 4000 pounds per square inch at a temperature of 1900° F. for 4 hours. A specimen of the resulting interface was photographed at a magnification of 500 times. The photograph is reproduced in the figure attached hereto. It may be seen by references to the photograph that the cladding alloy (the light area across the top) is completely bonded to the diffused chromium-yttrium layer immediately below the cladding. The light areas below the interface in the photograph are agglomerates of chromium which diffused into the yttrium matrix (the gray area across the bottom) during heat treatment and subsequently precipitated during hydriding.

Example II

Tensile tests were conducted on five specimens prepared by the method of Example I except that the Fe-25 Cr-5 Al cladding was bonded to the chromium-coated hydride at a pressure of 2000 rather than 4000 pounds per square inch. The tests were carried out at room temperature by conventional methods. In each test the specimen remained intact and a break occurred at the joint where the specimen was glued to the grip of the test apparatus, the strength of the glued joint being approximately 4000 pounds per square inch.

The tensile strength of yttrium hydride at room temperature is approximately 3600 pounds per square inch for hydride containing 2.1 weight percent hydrogen and 7500 pounds per square inch for hydride containing 1.85 weight percent hydrogen. The tensile strength of the clad-to-hydride bond therefore is at least equivalent to the tensile strength of the hydride itself.

In all cases where the clad-to-hydride bond prepared as described above has been disrupted mechanically, the cladding has retained a layer of hydride particles torn from the matrix. This behavior indicates that the clad-to-hydride bond has more strength than the hydride matrix.

The above examples are merely illustrative and are not to be understood as limiting the scope of our invention, which is limited only as indicated by the appended claims.

Having thus described our invention, we claim:

1. The method of preparing a clad hydride body which comprises applying a layer of metallic chromium at a thickness of 0.001 inch to 0.010 inch to a body consisting of a metal selected from the group consisting of yttrium and yttrium-base alloys, heating the resulting chromium-coated body at a temperature of 2000° F. to 2260° F. in a nonoxidizing atmosphere whereby said chromium is bonded to said body, hydriding the resulting bonded metal body and cladding the resulting chromium-coated hydride body with an oxidation-resistant metal.

2. The method of claim 1 wherein said layer of chromium is about 0.003 inch to 0.005 inch thick.

3. The method of claim 1 wherein the chromium-coated metal body is heated at a temperature of 2100° F. to 2200° F. for a period of about 1 to 4 hours.

4. The method of claim 1 wherein said oxidation-resistant metal is selected from the group consisting of iron-base alloys, nickel-base alloys and chromium-base alloys.

5. The method of claim 1 wherein the composition of said oxidation-resistant alloy is 15 to 30 weight percent chromium, 3 to 5 weight percent aluminum, 0.7 to 1.0 percent yttrium and the balance iron.

6. The method of claim 1 wherein said body consists of up to 5 weight percent chromium and the balance yttrium.

7. The method of claim 1 wherein said body consists of up to 30 weight percent zirconium and the balance yttrium.

8. The method of claim 1 wherein said body consists of up to 10 weight percent uranium and the balance yttrium.

No references cited.

JOHN F. CAMPBELL, *Primary Examiner.*